Patented Sept. 20, 1938

2,131,008

UNITED STATES PATENT OFFICE 2,131,008

PROCESS OF MAKING PHENYL MERCURIC NITRATE

James H. Hibben, Washington, D. C., assignor to Carl Maisel, Montclair, N. J.

No Drawing. Application August 5, 1933, Serial No. 683,902

5 Claims. (Cl. 260—433)

This invention relates to a process of producing phenyl mercuric nitrate.

The object of this invention is to produce phenyl mercuric nitrate in large quantities by an economical process at substantially low cost, in the form of a substantially pure stable compound, having a substantially fixed melting point, which will not disintegrate over extended periods of time, which is soluble in large quantities of water, and which can be produced with a high yield. A further object of this invention is to produce the phenyl mercuric nitrate (crystals) in sufficiently large crystals to indicate purity and to permit its ready determination by petrographic analysis.

By "stable compound" is to be understood a product which is devoid of substances, like silver salts, which decompose under the ordinary conditions of storage of the product.

Phenyl mercuric nitrate prepared according to the process of this invention has the following characteristics:

*Solubility:* Sparingly soluble in most ordinary solvents such as benzene, acetone, dioxan, cyclohexane, carbon tetrachloride; in alcohol 3 or 4 parts per thousand at room temperature; in water 1 part per thousand at approximately 60° C.; and approximately 12 parts per hundred in the monoethyl ether of diethylene glycol at 65° C.

*Optical properties:* Thin plates with a monoclinic or triclinic habit; refractive index $\gamma$ is nearly normal to the plates $\therefore$ $\alpha$ and $\beta$ nearly in the plane of the plates. $\alpha=1.59_5$, $\beta=1.77_0$, $\gamma$ somewhat greater than 1.79.

*Melting point:* 181°–185° with decomposition, the exact deflagration point depending on state of dryness and rate of heating.

*X-ray spectrum:* The compound phenyl mercuric nitrate has a definite X-ray spectrum consisting of ten or more lines.

*Composition by weight:* Carbon 21.21%, hydrogen 1.48%, oxygen 14.14%, nitrogen 4.12%, mercury 59.05%, said compound having the general formula $C_6H_5HgNO_3$.

Phenyl mercuric nitrate according to the invention of the present process is prepared as follows:

The nitrate is prepared by first synthesizing phenyl mercuric acetate, phenyl mercuric propionate, or the mercuric salt of other acid members of the same homologous series, such as for example, phenyl mercuric butyrate.

Phenyl mercuric sulfate and phenyl mercuric halides may also be employed for the preparation of the nitrate.

I. Inasmuch as any one of the above-mentioned compounds is treated in approximately the same manner, for the purpose of illustrating this invention, but one of them, to wit, phenyl mercuric acetate, is selected to illustrate the method of preparation. To accomplish this, for instance, chemically pure mercuric acetate is heated preferably to boiling with thiophene-free benzene in the presence of alcohol, acetic or propionic acid or other acids of the same homologous series for a number of hours. Alcohol, acetic acid, propionic acid or acids of the same homologous series not only serve as solvents but enter into the reaction, increasing the yield of phenyl mercuric acetate. Other compounds which similarly enter into the reaction and produce phenyl mercuric acetate may be used for this purpose. The phenyl mercuric acetate or salt thus produced is then precipitated by the addition of water, after distilling off the excess benzene, or the liquids are distilled off and the phenyl mercuric acetate or other phenyl mercuric salt obtained as a residue. In order to insure its purity the resultant product is then purified by recrystallizing from a suitable solvent, such as alcohol, dioxan, or diethylene glysolution of the acetate or other mercuric salts.

The resulting products thus formed have a col monoethyl ether either by virtue of differential solubilities at different temperatures or by the addition of water to a reasonably concentrated purity in excess of 98 per cent and may be further purified, if necessary, by repeated recrystallization.

II. Phenyl mercuric nitrate is prepared from pure phenyl mercuric acetate or other phenyl mercuric salt, made as described in Paragraph I, in several ways:

(A) By treating a water suspension or solution of the crystals prepared as above with a nitrate, including nitric acid (hydrogen nitrate) and inorganic nitrates, such as for example, sodium nitrate, barium nitrate, calcium nitrate, potassium nitrate, strontium nitrate, or other suitable light-insensitive inorganic nitrate having, like those just referred to, a cation which forms a stable compound with the anion of the phenyl mercuric salt, such compound being relatively soluble in water, all of which are hereinafter referred to as agents capable of converting the acetate into the nitrate, or (B) Phenyl mercuric nitrate may be prepared by first suspending or dissolving the pure compound prepared under Paragraph I hereof in a suitable inert solvent, in which it has a reasonable degree of solubility and with which it will not react, such as for example, alcohol, dioxan, or diethylene glycol monoethylether. Solvents such as acetic acid, however, are not suitable for this purpose. The solution of the phenyl mercuric compound is then mixed with a concentrated aqueous solution of any of the above mentioned agents capable of converting the acetate to the nitrate, preferably in excess of equimolecular proportions, excepting nitric acid which is not satisfactory in this step, and subsequently diluted with a volume of water which is slightly greater than the volume of the mixed solutions.

(C) Phenyl mercuric nitrate is prepared by converting the pure product as described under Paragraph I into phenyl mercuric sulfate and making an aqueous solution or suspension of the sulfate, which is then allowed to react with the above named agents capable of converting the phenyl mercuric compounds to the nitrate with the exception of nitric acid. This reaction may also be carried out in a suitable organic solvent, such as for example, alcohol, dioxan, or diethylene glycol monoethyl ether, in which the sulfate may be partially soluble and in which the nitrate is less soluble. The steps in the process are similar to those described in Paragraph (B).

(D) Phenyl mercuric nitrate may be prepared by converting the pure product as described under Paragraph I into phenyl mercuric halide and treating the suspension or solution of the halide in a suitable organic solvent with thallium nitrate or other suitable nitrate containing a cation whose halide is more insoluble than the phenyl mercuric halide. The further steps in the process are those as described under Paragraph (B).

III. To insure purity, the phenyl mercuric nitrate thus prepared is preferably washed with water and alcohol to remove the mother liquor and traces of residual impurities. The phenyl mercuric nitrate can be subjected to a further purification step by recrystallizing it through the addition of water to its solution in an inert solvent in which it may be reasonably soluble, such as, for example, the water-miscible diethylene glycol monoethyl ether. The over-all yield in this process is between 80 and 95 per cent, based on the quantity of mercuric compound used.

The phenyl mercuric nitrate in the pure form may be advantageously used as a pharmaceutical in treating bacterial infection of human beings and as an intermediate for producing other organo-metallic compounds.

I claim:

1. The process of producing substantially pure phenyl mercuric nitrate comprising reacting an organic phenyl mercuric salt dissolved in a water-miscible organic solvent with a light-insensitive inorganic nitrate whose cation forms a relatively soluble compound with the acid radical of the phenyl mercuric salt, and then adding water to precipitate the phenyl mercuric nitrate so formed.

2. The process of purifying a relatively crude phenyl mercuric nitrate obtained by reacting a solution of an organic phenyl mercuric salt with a light-insensitive inorganic nitrate whose cation forms a relatively soluble compound with the acid radical of the ester, comprising dissolving the product in diethylene glycol monoethyl ether and then precipitating the phenyl mercuric nitrate by the addition of water.

3. The process of making phenyl mercuric nitrate which consists in treating substantially pure phenyl mercuric propionate, dissolved in a non-reactive organic solvent, with a light-insensitive inorganic nitrate capable of entering into double decomposition with the phenyl mercuric salt, the cation of the nitrate being such as to form a relatively soluble compound with the propionate radical, and then precipitating the phenyl mercuric nitrate with water from its solution in a water-miscible neutral, organic solvent.

4. The process of making phenyl mercuric nitrate by treating a solution of a substantially pure phenyl mercuric salt other than the nitrate, in dioxan with a light-insensitive metal salt of nitric acid, the metal being such as forms a relatively soluble compound with the acid radical of the phenyl mercuric salt, and adding water to the solution to precipitate the phenyl mercuric nitrate so produced.

5. The process of making phenyl mercuric nitrate by treating a solution of a substantially pure phenyl mercuric salt, other than the nitrate, in diethylene glycol monoethyl ether, with a light-insensitive inorganic nitrate whose cation forms a relatively soluble compound with the acid radical of the phenyl mercuric salt, and adding water to the solution to precipitate the phenyl mercuric nitrate so produced.

JAMES H. HIBBEN.